US 8,058,822 B2

(12) United States Patent
D' Acosta Ruiz et al.

(10) Patent No.: US 8,058,822 B2
(45) Date of Patent: Nov. 15, 2011

(54) POWER SAVER DEVICE FOR PUBLIC LIGHTING SYSTEMS AND METHOD THEREOF

(75) Inventors: Jose Mauricio D' Acosta Ruiz, Municipio Calimaya (MX); Jose Alejandro Luna Peralta, Colonia Bosques de las Lomas (MX); Miguel Angel Rojas Gutierrez, Colonia Lomas Zaragoza (MX)

(73) Assignee: Luxtronic, S.A. DE C.V., Colonia Juarez (MX)

( * ) Notice: Subject to any disclaimer, the term of this patent is extended or adjusted under 35 U.S.C. 154(b) by 1156 days.

(21) Appl. No.: 11/588,214

(22) Filed: Oct. 27, 2006

(65) Prior Publication Data
US 2007/0229000 A1 Oct. 4, 2007

(30) Foreign Application Priority Data
Oct. 28, 2005 (MX) .................... PA/A/2005/011674

(51) Int. Cl.
*H05B 37/02* (2006.01)
(52) U.S. Cl. ........ 315/360; 315/308; 315/247; 315/307; 315/291
(58) Field of Classification Search .................. 315/291, 315/307, 308, 224, 129, 149, DIG. 7, 246, 315/247, 360; 323/268
See application file for complete search history.

(56) References Cited

U.S. PATENT DOCUMENTS

| | | | |
|---|---|---|---|
| 5,677,602 A * | 10/1997 | Paul et al. | 315/307 |
| 6,191,568 B1 * | 2/2001 | Poletti | 315/360 |
| 6,259,215 B1 | 7/2001 | Roman | |
| 6,900,599 B2 | 5/2005 | Ribarich | |
| 2004/0130274 A1 * | 7/2004 | DuLaney et al. | 315/291 |
| 2006/0113922 A1 * | 6/2006 | Ribarich et al. | 315/209 R |

FOREIGN PATENT DOCUMENTS
MX 2003/004352 5/2003
* cited by examiner

*Primary Examiner* — Jacob Y Choi
*Assistant Examiner* — Ephrem Alemu
(74) *Attorney, Agent, or Firm* — Kramer & Amado P.C.

(57) ABSTRACT

Various exemplary embodiments relate to an energy saving device which supplies high efficiency sodium-vapor street lights and a method of providing additional savings of electrical energy by means of the temporary reduction in the luminous flow of a high efficiency sodium-vapor street light. The energy saving device includes in its operation protection against low voltage supply, regulation of supply voltage, and protection in absence or damage of the lamp. In turn, the method includes a sequence for reliable ignition of the lamp, a modulation routine in frequency for elimination of acoustic resonance, and an automatic turn off sequence in view of damage of the photocell, as well as a consumption detection system to keep the output power steady and therefore, keep the power consumption under a steady value.

9 Claims, 7 Drawing Sheets

POWER SAVER DEVICE FOR PUBLIC LIGHTING SYSTEMS AND METHOD THEREOF

FIELD

This invention is related to an energy saving device used in public lighting systems. Specifically, the invention is related to a device to supply high pressure sodium-vapor street lights and a method for saving electrical energy using the device.

BACKGROUND

Public lighting systems are one of the electrical loads consuming the highest level of energy, and therefore, any improvement to the efficiency of these systems results in a great saving of energy for the companies producing electrical energy, which results in less consumption of fossil fuel and less air pollution. One of the most efficient sources currently known is the sodium-vapor street light; its high efficiency is one of the main reasons why it is preferred in public lighting systems. The combination of a sodium-vapor street light along with an electronic ballast results in significant saving of electrical energy, and if a luminous intensity control reducing the energy consumption at dawn is added thereto, the result is a very important saving of energy compared to a conventional system using mercury-vapor street lights and electromagnetic ballast.

Some energy saving devices use a micro controller for the control of the electronic ballast elements which supply the sodium-vapor street light, allow greater flexibility for the control of the luminous intensity, the protections associated with the lighting process of the lamp, and also reduce the number of necessary components and the size of the ballast. Such devices also allow the implementation of techniques for simple elimination of acoustic resonances without adding additional elements.

Generally, sodium-vapor street lights require a lighting voltage above 2000 volts; in order to provide these voltage levels, an igniter is usually used. The use of this additional component increases the ballast cost, hence, the ballast resonator should be capable of providing these voltage levels. An alternative solution is to use a resonant tank circuit which provides the sufficient voltage to light a lamp. The resonant tank circuit is capable of providing high voltage levels during a very brief time. When the time is extended, the high currents involved in the lighting process may damage the semiconductors devices of the resonator. This condition may occur when no lamp was connected to the resonator or when a lamp has just turned off and it is intended to immediately re-light the lamp after turning it off. In order to avoid this damage, a protection is necessary which detects if the lamp has already turned on and otherwise deactivates the ballast.

Another risk condition of the energy saving devices occurs when the electronic ballast supply voltage is lower than the nominal voltage; according to the standards, all electronic ballast may include a correcting stage of the energy factor which provides a voltage level and continuous energy to the ballast resonator. If the supply voltage falls below a critical level, the current requested by the energy factor corrector is increased at the same ratio and it may damage the semiconductor devices of the corrector. Therefore, a protection deactivating the electronic ballast is necessary under low supply voltage conditions.

Ohkubo and Miyagaki proposed electronic ballast in U.S. Pat. No. 5,482,860, which includes a microprocessor that is mainly used to program a control method preventing the acoustic resonant phenomenon. The disadvantage of the control method described in this patent consists in that the protection sequence or the lighting process of the lamp are not established.

Electronic ballast for high intensity discharge lamps capable of providing high voltage levels for lighting of the lamp is presented in U.S. Pat. No. 5,677,602, the ballast includes a protection to detect the lighting of the lamp. However, this protection uses an operational amplifier for the detection of current which increases the final product cost.

U.S. Pat. No. 6,137,240 discloses a control circuit for a universal ballast based on a micro controller. The universal ballast may turn on, stabilize and control the luminous intensity of the lamp. The ballast may have a corrector of the energy factor based on an elevator converter and may establish options to supply the micro controller from the elevator converter. The above-mentioned control circuit presents the following disadvantages: programming of the micro controller does not include any action to eliminate the acoustic resonance phenomenon; it neither includes protection against absence of the lamp or protection of the elevator converter against supplying from Alternating Current (AC) sources of low voltage.

U.S. Pat. No. 6,329,761 discloses electronic ballast for high intensity discharge lamps allowing the control of luminous intensity and presents a high energy factor. However, this invention does not use a micro controller and for the lighting of the lamp it uses a special circuit for this function which increases the number of components and its complexity and, therefore, the cost.

Notwithstanding the above-mentioned description in the technical field, there is still the need of an energy saving device for public lighting systems which is easy, efficient, includes a luminous intensity control, low cost and exceeds the energy savings provided by known systems.

SUMMARY

In comparison with the above-described patents, the first purpose of the invention is to provide a device which allows the electric energy saving in public lighting systems based on the following actions:

a) Use of a discharge lamp of high luminance efficiency.

b) Use of high efficiency electronic ballast with a high energy factor which turns the lamp on without the need of an additional igniter.

c) A method consisting in the decrease of luminous intensity provided by the lamp at late hours at night, which may be comprised of attenuation, a number of attentions, or not attenuating.

d) Registration of output consumption, this is important since such lamps vary their consumption according to the temperature or aging thereof. Upon having a closed loop supply, we may keep the exit energy steady regardless of the temperature variations of the environment, the input voltage changes, or the age of the lamp.

A second purpose is to provide the energy saving device of this invention with a micro controller which reduces the number of components and the cost of the energy saving device and so that, in comparison with the above-mentioned patents, it contains the programming of a method for the saving of energy which consists of the following steps:

a) Generate the control signals of the semiconductors associated with the resonator.

b) Make a modulation of the operation frequency of the resonator circuit used for the elimination of the acoustic resonance.

c) Establish a sequence for the lighting of the lamp preventing the damage of the semiconductors associated to the used resonator.

d) Vary the luminous intensity of the lamp and therefore, the energy consumption after a previously fixed time of operation.

e) Detect the supply voltage of the line to turn off the lamp in case of high or low voltage.

f) Register the consumption to keep steady energy regardless of temperature changes, line voltage, or aging of the lamp.

g) Deactivate the used resonator operation upon not turning on or turning off the lamp.

h) Restart the used resonator operation after a fixed number of operational hours elapse.

Now then, by the use of a micro controller in the energy saving device of this invention, there is a significant reduction in the number of analog components which would be necessary to make all of the actions described in the second purpose, and since the micro controller has a very low cost, there is a substantial reduction in the cost of the energy saving device of this invention.

A third purpose is to provide the energy saving device of this invention with a circuit for the detection of the lighting of the lamp; in order to prevent damages in the used resonator semiconductors, the circuit protects the energy saving device of this invention against the damage in the lamp or against absence thereof.

A fourth purpose is to provide the energy saving device of this invention with a protection against high or low voltage of the Alternating Current (AC) supply source which is also registered by the micro controller which prevents damage due to over voltage in the corrector semiconductors of the energy factor.

DETAILED DESCRIPTION

Figure 1:
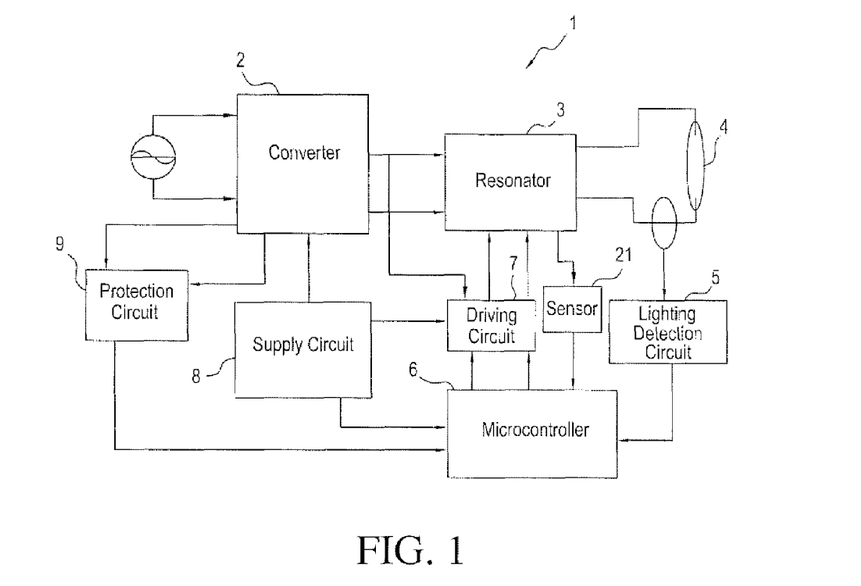
FIG. 1 presents the block diagrams of the energy saving device for public lighting systems according with this invention.
Figure 2:
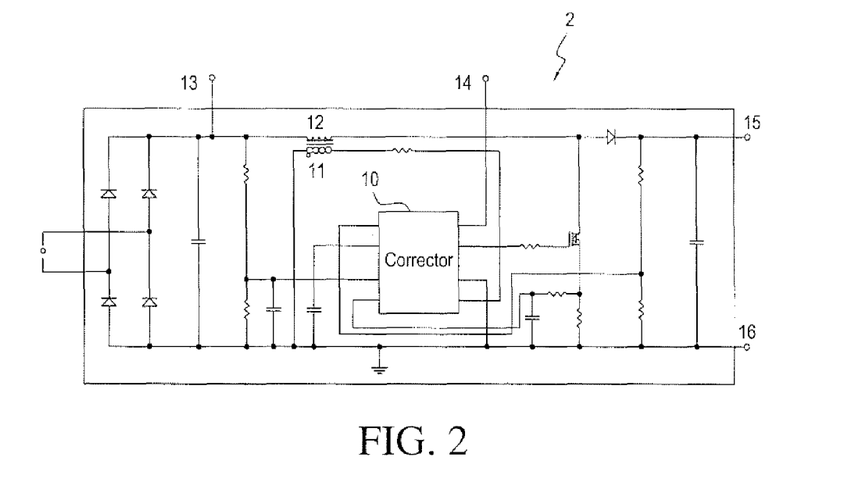
FIG. 2 corresponds to the corrector diagram of the energy factor used in the device of this invention.

Regarding FIG. 1, the energy saving device for public lighting systems (1), subject matter of the invention, may be observed in FIG. 1 and that it is comprised of the following components:

A corrector converter of the energy factor (2), based on an elevator converter; a resonator (3), the preferred embodiment of this circuit for this invention is an amplifier class (D); number (4) represents a high efficiency sodium-vapor street light; number (5) represents a circuit for the detection of the lighting of the high efficiency sodium-vapor street light (4); number (6) represents a micro controller; number 21 represents a sensor for the energy consumption; number (7) represents a driver for the switches handling; number (8) represents the supply circuit for the digital and control stages and number (9) represents a circuit for the protection against low voltage of the energy saving device (1), now then, the corrector converter of the energy factor (2) is shown in FIG. 2, this converter (2) is in charge of correcting the energy factor of the energy saving device (1) so that it is close to the unit, a second function of the converter (2) is to provide a steady voltage level to the resonant resonator stated under number (3).

Figure 3:
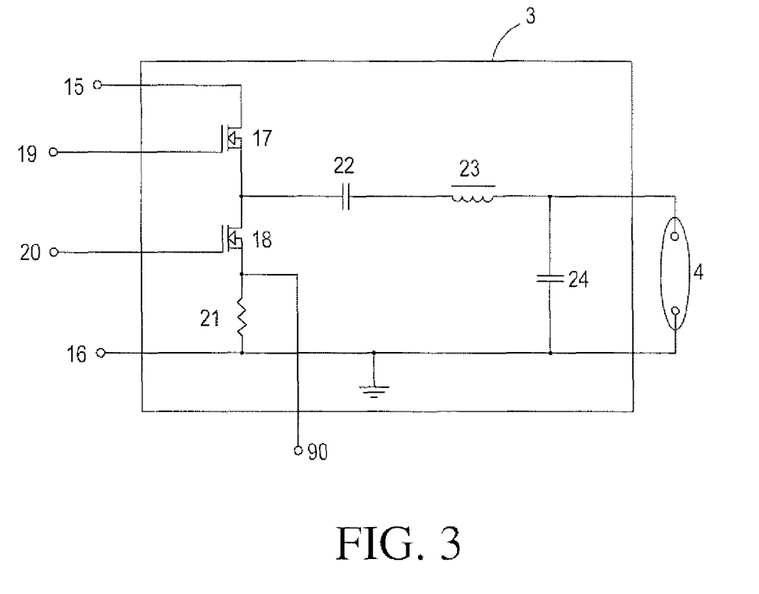
FIG. 3 shows the resonant resonator diagram used as resonator in the energy saving device for public lighting systems and a resistance allowing the registration of the current for supply and control by the closed loop.
Figure 6:
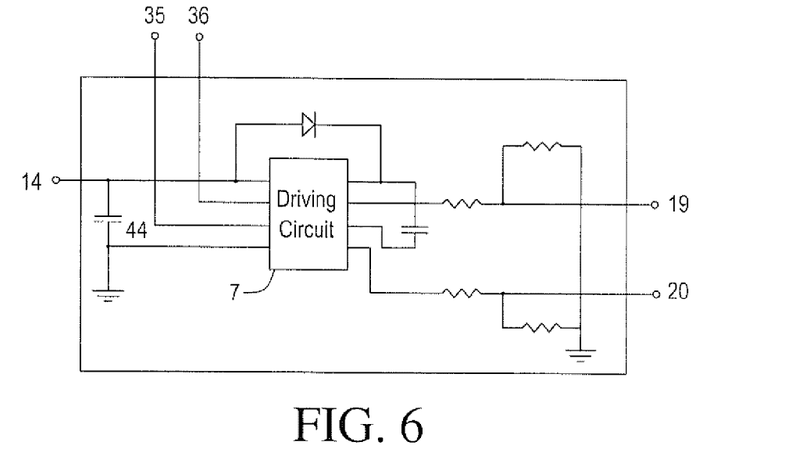
FIG. 6 shows the connections diagram of the driving circuit used for handling of the resonator switches.

FIG. 3 shows the resonant resonator (3) which is used to supply the high efficiency sodium-vapor street light (4), in this circuit the voltage provided by the terminal (15) is cut by means of switches (17) and (18), thus generating a unipolar square wave; the control signals stated with numbers (19) and (20), of the switches (17) and (18) are provided by the driver (7), which is illustrated in FIG. 6, this signal is applied to the resonant tank circuit formed by the capacitor (22), the inductor (23) and the capacitor (24), which filters the fundamental component of this signal and it applies it to the high efficiency sodium-vapor street light (4), the voltage component of the unipolar square wave is filtered by the capacitor (22), for a greater stability of the current of the high efficiency sodium-vapor street light (4); the operation frequency, once the high efficiency sodium-vapor street light (4) is turned on, is always lower than the resonance frequency with the high efficiency sodium-vapor street light (4) on, which guarantees an inductive behavior of the resonant tank circuit. When there is an inductive behavior, it is observed that: the higher the frequency the lower is the energy supplied to the high efficiency sodium-vapor street light (4) and at lower frequency the energy in the high efficiency sodium-vapor street light (4) is increased. These operation conditions allow the control of the energy in the high efficiency sodium-vapor street light (4) varying the operation frequency of the resonant tank circuit and therefore, control the luminous intensity of the high efficiency sodium-vapor street light (4). However, upon decreasing with this method the energy supplied to the high efficiency sodium-vapor street light (4), there is the risk that for low energy, the electric arch in the high efficiency sodium-vapor street light (4) is extinguished. In order to avoid this risk, a resonant tank circuit is designed so that it supplies the minimum intended energy to the high efficiency sodium-vapor street light (4). In this way, it is guaranteed that for this minimum energy the electrical arc does not turn off. Further detail for the design process of a resonant tank circuit to a given energy of the high efficiency sodium-vapor street light (4) may be found in the Article "A Comparison of LCC and LC Filters for its Application in Electronic Ballast for Metal-Halide Lamps" by J. Correa, et al, published in IEEE ENERGY Electronics Specialist Conference (PESC) held in Vancouver (Canada), June 2001.

In the energy saving device (1) of this invention, the resonant tank circuit is also used for lighting the high efficiency sodium-vapor street light (4), hence, a frequency scan is made by means of the micro controller, stage (65) of the signal applied to the tank circuit, in such a way that the resonant frequency is in this scan. The purpose of the frequency scan is that the unipolar square signal frequency applied to the resonant tank circuit matches with the frequency of the tank circuit despite the variations in the values of its elements due to the tolerance thereof. Further detail on the lighting process is provided in the description of FIG. 8.

Figure 4:
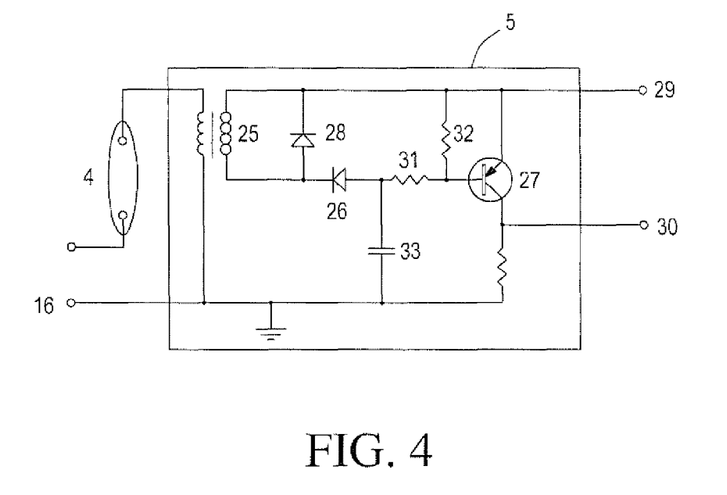
FIG. 4 presents the scheme proposed for the detection of the lighting of the lamp.

FIG. 4 shows a circuit for the detection of lighting (5) of the high efficiency sodium-vapor street light (4), in said circuit (5), the current through the high efficiency sodium-vapor street light (4) is detected by means of a voltage current transformer (25), the alternate voltage in the terminals of the secondary of the transformer (25) is rectified by the diode (26); in this way, the secondary of the transformer (25) only applies positive voltage pulses between the base and the transmitter of the PNP transistor (27), to avoid electromagnetic noise signals during the negative pulses in the transformer (25), the diode (28) circuit breaks the secondary of the transformer (25). The positive pulses polarize the transistor (27) taking it to saturation. Upon said transistor being saturated (2) it behaves as a closed switch, therefore, the voltage of the terminal (29) is applied in the terminal (30), the voltage in the terminal (30) is sent in turn to the micro controller (6) indicating it that the high efficiency sodium-vapor street light (4) is on. Resistance (31) acts to limit the base current in the transistor (27), and resistance (32) acts as fastening of the transistor base (27) to the terminal (29) to avoid it is floated when there is no current to the high efficiency sodium-vapor street light (4). Capacitor (33) stores part of the pulsing energy supplied by the transformer (25) thus helping to keep the transistor (27) continuously saturated while there is current to the high efficiency sodium-vapor street light (4).

Figure 5:
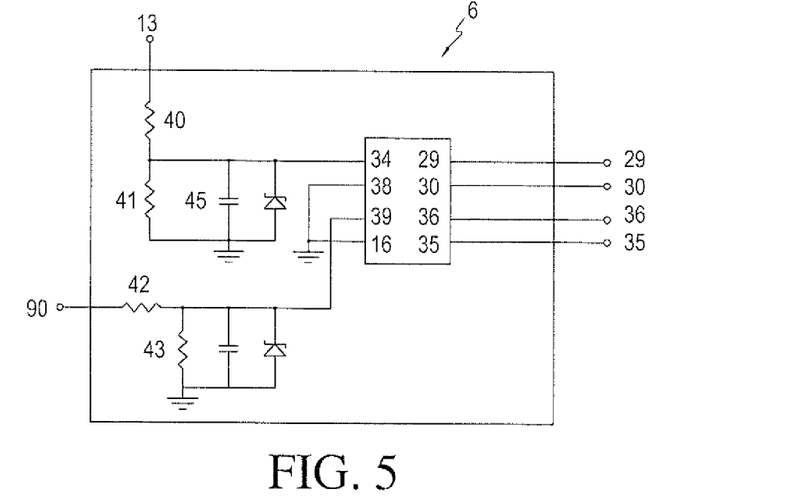
FIG. 5 corresponds to the connections diagram of the micro controller which includes the protection against low voltage in the supply used in the energy saving device of this invention.

FIG. 5 shows the connections diagram to the micro controller (6) used in the energy saving device (1), which is comprised by 8 terminals; terminal (29) supplies the circuit, terminal (34) detects the line voltage for turning off in high or low voltage (9), which comes from a voltage divisor formed by some resistances (40) and (41), terminals (35), (36), (30), (38), (39) which are five in and out ports and terminal (16) which is the ground connection of the micro controller (6). The terminal port (30) is used to detect the lighting of the high efficiency sodium-vapor street light (4), port of terminal (36) is used to send the control signal to the switches (17) and (18), port terminal (35) sends the deactivation signal to the resonant resonator (3) in absence of current to the high efficiency sodium-vapor street light (4) or when there is low line voltage, terminal (38) is the reference to ground for terminal (39), terminal (39) detects the consumed current for lamp (4) already converted into voltage by the resistance (21) and divided by resistances (42) and (43) so that the measured voltage rank is in the values handled by the micro controller (6), all this so that the micro controller (6) has a closed loop control and keeps the energy consumption steady.

FIG. 6 shows the driving circuit (7) used in the energy saving device (1) of this invention. Driving circuit (7), receives the control signal sent from the corresponding micro controller port (6) to the terminal (36) and it divides it into two out of phase signals of 180 degrees, terminals (19) and (20), these two signals are conditioned to a suitable voltage level for the lighting of the switches (17) and (18) and with the separation off time between each one of them to prevent simultaneous lighting of switches (17) and (18).

Figure 7:
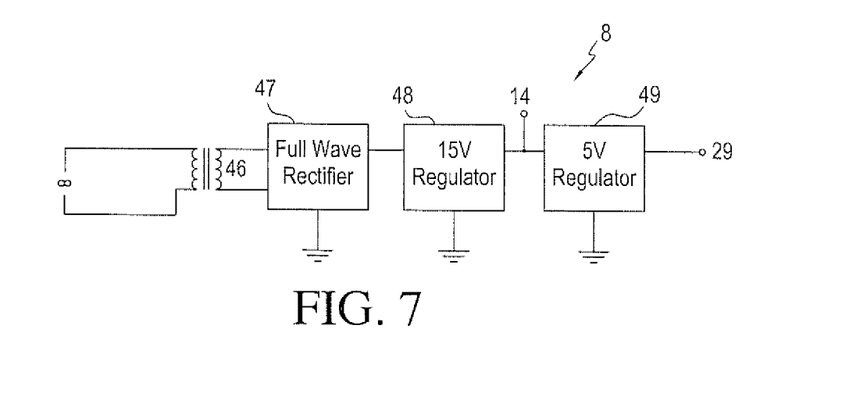
FIG. 7 shows a diagram of the low voltage supply source for monolithic integrated circuits.

FIG. 7 shows the supply circuit of 5 volts of direct current for the micro controller (6) and 15 volts of direct current for the corrector (10) and the driver (7) which has a transformer (46) for the galvanic isolation and voltage reducer, a full wave rectifier (47), a voltage regulating circuit at 15 volts (48), and a voltage regulating circuit at 5 volts (49).

Figure 8:
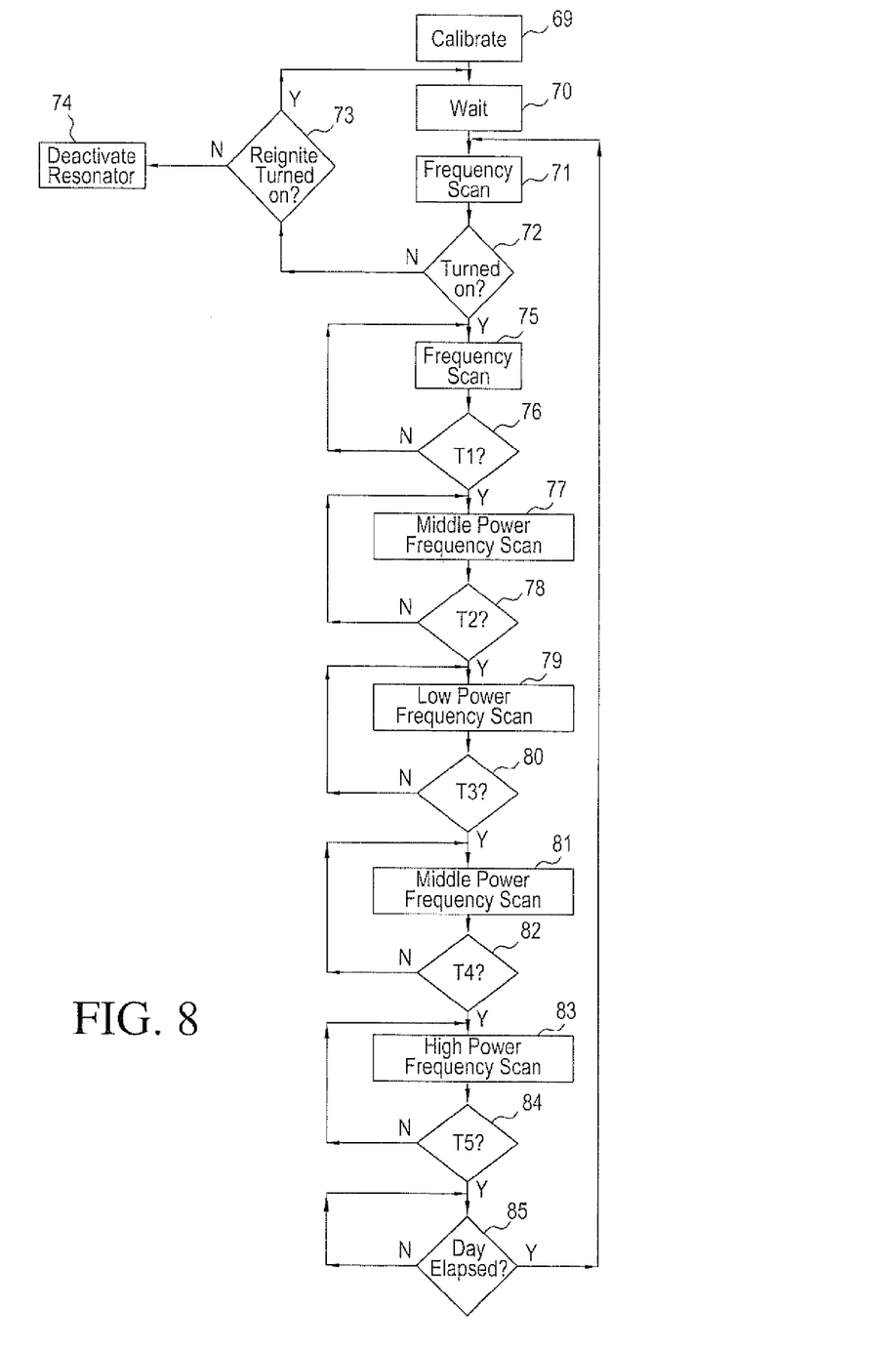
FIG. 8 shows the flow chart of the micro controller programming used in the energy saving device for public lighting systems.

FIG. 8 shows the flow chart of the energy saving method of the energy saving device (1) of this invention and that it is part of the micro controller programmer (6). The stages of the method are the following: a calibrating routine of the internal clock is established in the stage (69), the corresponding in and out ports are to the terminals (39), (40), (34), (41), (42) and the internal clocks of the micro controller (6) configured.

There is a waiting period from 5 to 10 seconds to allow the generation of the start-up pulses in the state (70), since if there has been a black out or a lamp has turned off (4), said lamp does not try to immediately turn on, since it will be hot and the lamp (4) will not turn on, thus, it will be worn out due to many failed attempts to turn it on, in this way, there will be a waiting period from 5 to 10 seconds between each attempt to turn on the lamp.

Stage (71) consists of making a frequency scan from 95% of the vacuum resonant frequency of the resonant tank circuit formed by the capacitor (22), the inductor (23) and the capacitor (24) until 105% of the resonant frequency, in this way, it is guaranteed that despite the capacitor (22) tolerance and the capacitor (24) and the saturation effects of the inductor (23), one of the scan frequencies will be equal to the vacuum frequency of the resonant tank circuit.

The following stage (72) consists in verifying the terminal (30) status of the micro controller (6), if the terminal (30) is the same as one logic then the high efficiency sodium-vapor street light (4) indeed turned on and it goes to stage (75); if the terminal (30) is the same as a zero logic, then the high efficiency sodium-vapor street light (4) did not turn on. If the high efficiency sodium-vapor street light (4) did not turn on, stage (73) shall apply.

Stage (73) is a routine for reigniting the high efficiency sodium-vapor street light (4) after a failed attempt to turn it on in stage (72). The purpose of this re-ignition sequence is to apply high voltage peaks to the high efficiency sodium-vapor street light (4) for the ignition thereof during eight or more times at twenty-second intervals between each impulse (70). In this way, it is possible to reignite the high efficiency sodium-vapor street light (4) after a black out has occurred and it also enables to turn on the old high efficiency sodium-vapor street light (4). The above is attained by means of the application to the high efficiency sodium-vapor street light (4) of two or more consecutive high voltage peaks (72), all of the above without damaging the switches (17) and (18). If once the re-ignition routine is applied to the high efficiency sodium-vapor street light (4) it still remains turned off, there are two cases: the first one is that one of the high efficiency sodium-vapor street light (4) is not connected to the energy saving device (1), the second case is that the connected high efficiency sodium-vapor street light (4) is already too old and it is not possible to turn it on, therefore, it is applicable in both cases to deactivate the used resonator (3), stage (74) in FIG. 8, it is important to highlight that if the high efficiency sodium-vapor street light (4) turns on, stage (75) will apply.

Stage 75, consists in applying an increased scan in the switching frequency of the used resonator (3) from 90% to 93% of the nominal frequency of operation up to 107% to 110% of the nominal frequency of operation and afterwards a decreased scan from 107% to 110% of the nominal frequency from 90% up to 93% of the nominal frequency, the frequency increments of these increased and decreased scans range from 200 Hz to 300 Hz. The purpose of these scans is to avoid the occurrence of an acoustic resonance phenomenon in the high efficiency sodium-vapor street light (4).

Figure 9:
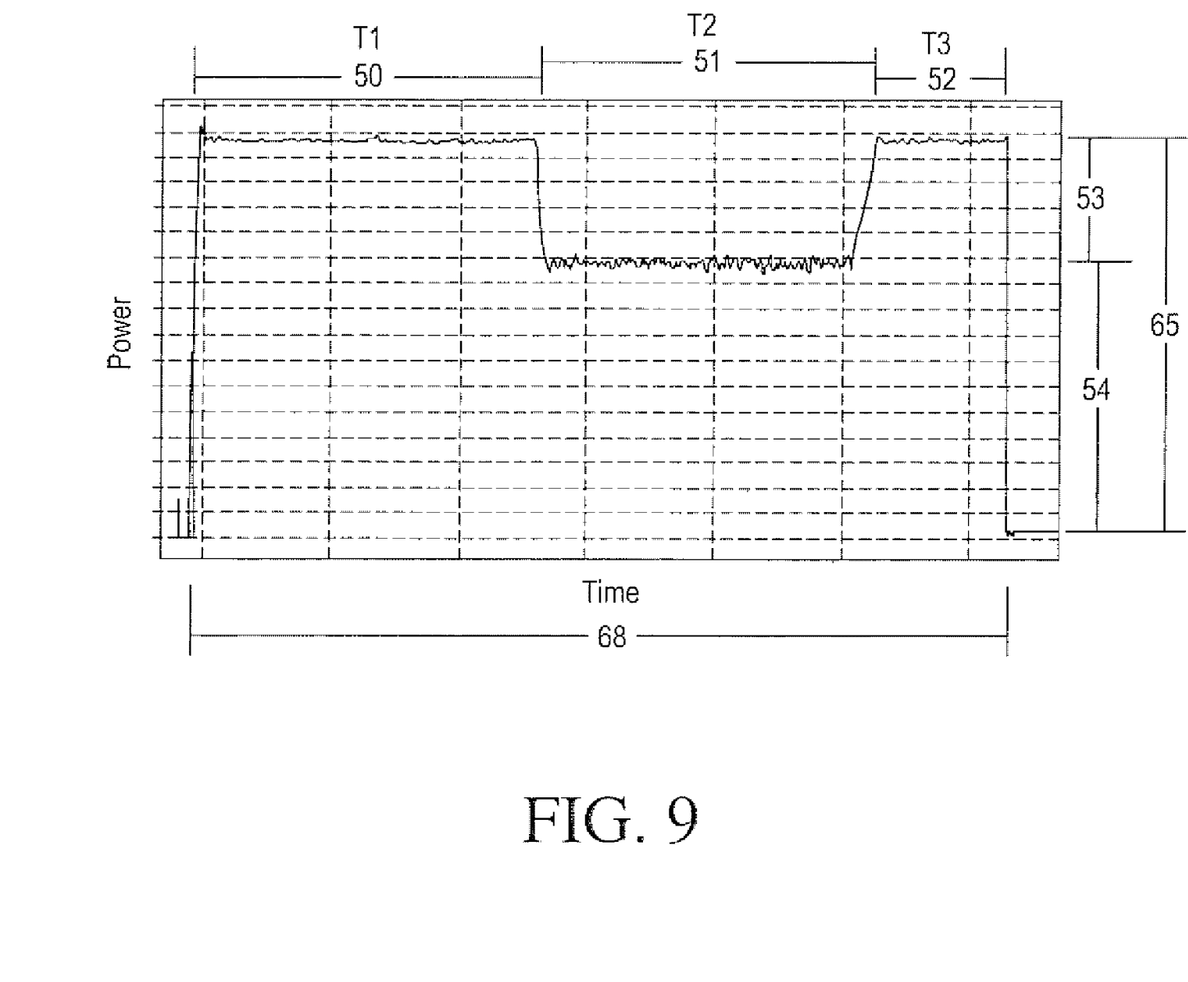
FIG. 9 shows an operation graph of the ballast with an attenuation level.

During each one of the frequency scans of stage (75), stage (76) must apply at all times, which consists in counting the elapsed time from the ignition of the high efficiency sodium-vapor street light (4) until the time it reaches (50) FIG. 9 of T1 and once said period of time is concluded, stage (77) is applicable and if it has not been reached yet, stage (75) applies and so forth.

Stage (77) consists in decreasing the power to a specific percentage by varying the medium frequency and sensing (21) the power until obtaining the scheduled result. An increased scan is applied to this section in the switching frequency of the used resonator (3) from 92.5% of the nominal frequency of operation up to 107.5% of the nominal frequency of operation and afterwards a decreased scan from 107.5% of the nominal frequency of operation up to 92.5% of the nominal frequency of operation, the increments of frequency of these increased and decreased scans range from 200 Hz to 300 Hz, the medium frequency of these scans will depend on the power percentage required to obtain the high efficiencysodium-vapor street light (4). The purpose of these scans is to prevent the occurrence of the acoustic resonance phenomenon in the high efficiency sodium-vapor street light (4).

During each one of the frequency scans of stage (77), stage (78) applies at all times which consists in counting the elapsed time from the ignition of the high efficiency sodium-vapor street light (4) until the moment it reaches (51) FIG. 9 or T2 and once said period of time is concluded, stage (79) applies, and if it has not been reached yet, stage (77) applies and so forth.

Stage (79), (which applies only when there is double attenuation) consists in decreasing the power again in a specific percentage (57), varying the medium frequency, and sensing (21) the power until reaching the scheduled result (74). Increased scan is applied in this section in the switching frequency of the resonator used (3) from 92.5% of the nominal frequency of operation up to 107.5% of the nominal frequency of operation and afterwards a decreased scan from 107.5% of the nominal frequency of operation up to 92.5% of the nominal frequency of operation, the frequency increments of these increased and decreased scans range from 200 Hz to 300 Hz, the medium frequency of these scans will depend on the power percentage required for the high efficiency sodium-vapor street light (4). The purpose of these scans is to prevent the occurrence of the acoustic resonance phenomenon in the high efficiency sodium-vapor street light (4).

Figure 10:
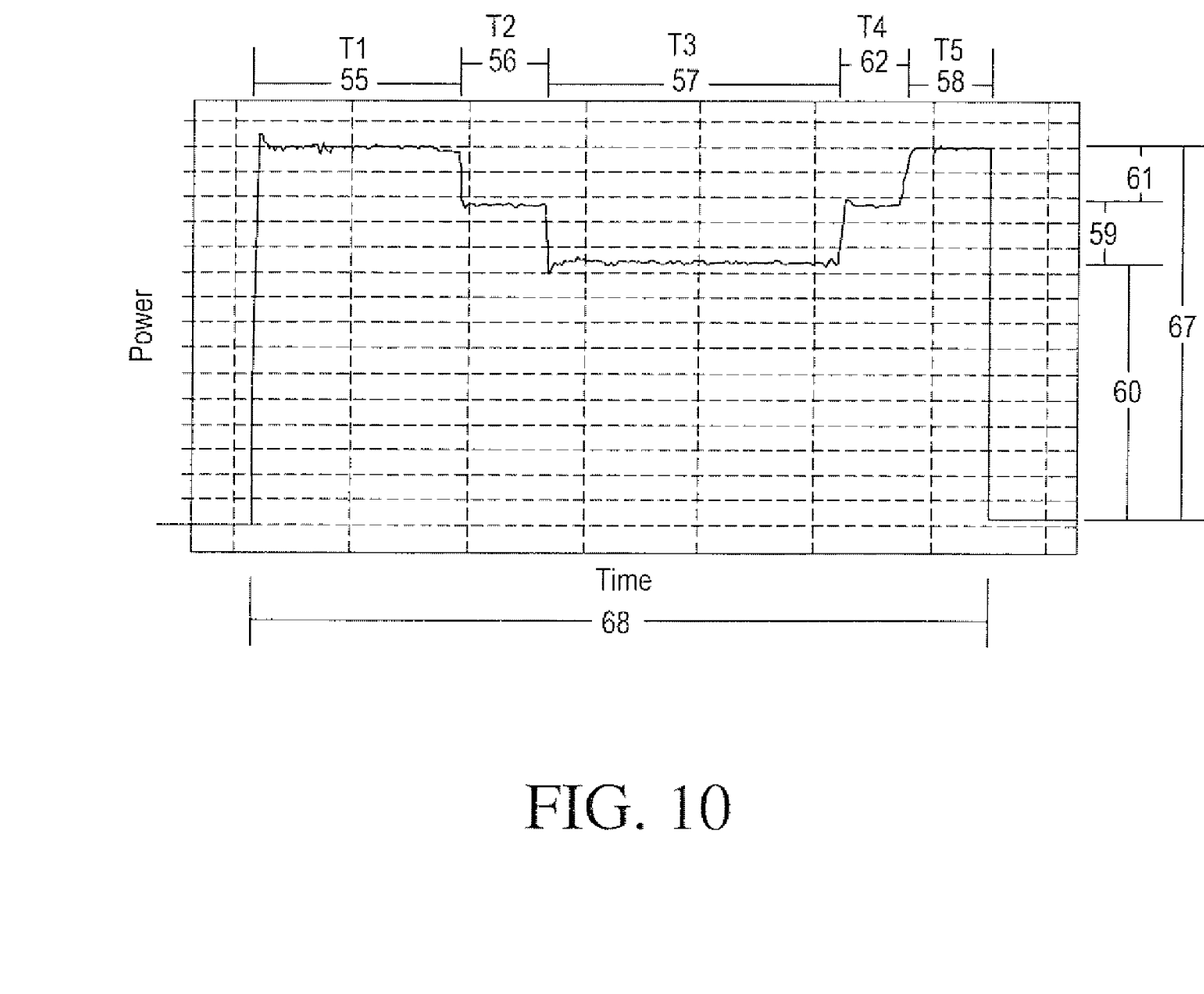
FIG. 10 show an operation graph of the ballast with double attenuation.

During each one of the frequency scans of stage (79), stage (80) applies at all times, which consists in counting the elapsed time from the ignition of the high efficiency sodium-vapor street light (4) until the moment it reaches (57)) FIG. 10 or T3 and once said period of time is concluded, stage (81) applies and if it is not reached yet, stage (79) applies and so forth.

Stage (81), (which applies only when there is double attenuation) consists in increasing the power in a specific percentage, varying the frequency means, and sensing (21) the power until reaching the scheduled result. Increased scan is applied in this section in the switching frequency of the used resonator (3) from 92.5% of the nominal frequency of operation up to 107.5% of the nominal frequency of operation and afterwards a decreased scan from 107.5% of the nominal frequency of operation up to 92.5% of the nominal frequency of operation, the frequency increases of these increased and decreased scans range from 200 Hz to 300 Hz, the medium frequency of these scans will depend on the power percentage required for the high efficiency sodium-vapor street light (4). The purpose of these scans is to prevent the occurrence of the acoustic resonance phenomenon in the high efficiency sodium-vapor street light (4).

During each one of the frequency scans of stage (81), stage (82) applies at all times, which consists in counting the elapsed time from the ignition of the high efficiency sodium-vapor street light (4) until the time it reaches (62) FIG. 10 or T4 and once said period of time concludes, stage (83) applies and if it has not been reached yet, stage (81) applies and so forth.

Stage (83), (which applies only when there is double attenuation) consists in increasing the power in a specific percentage, varying the frequency means, and sensing (21) the power until reaching the scheduled result. Increased scan is applied in this section in the switching frequency of the used resonator (3) from 92.5% of the nominal frequency of operation up to 107.5% of the nominal frequency of operation and afterwards a decreased scan from 107.5% of the nominal frequency of operation up to 92.5% of the nominal frequency of operation, the frequency increases of these increased and decreased scans range from 200 Hz to 300 Hz, the medium frequency of these scans will depend on the power percentage required for the high efficiency sodium-vapor street light (4). The purpose of these scans is to prevent the occurrence of the acoustic resonance phenomenon in the high efficiency sodium-vapor street light (4).

During each one of the frequency scans of stage (83), stage (84) applies at all times, which consists in counting the elapsed time from the ignition of the high efficiency sodium-vapor street light (4) until the time it reaches (68) FIG. 10 or T5 and once the period of time concludes, stage (85) applies and if it has not been reached yet, stage (83) applies and so forth.

If due to a malfunction of the photocell, the photocell does not cut the energy supply and the energy saving device (1) continues working, stage (84) will apply. During this stage, the elapsed time will continue to be counted and upon reaching a previously fixed time (T5) (68), the used resonator would be deactivated (3), turning off the high efficiency sodium-vapor street light (4), stage (85) to prevent energy consumption during the day.

Once the high efficiency sodium-vapor street light (4) is turned off, the energy saving device (81) will continue operating but with the turned off resonator (3), and the time will continue to be counted by the micro controller (6) until it reaches stage (85). It is verified during this stage if the counted time has reached 24 hours (one day) if so, stage (71) would repeat the process, and if the time has not reached 24 hours, then stage (85) is maintained.

FIG. 9 shows the operation of the energy saving device regarding the power consumption vs. time in a single attenuation operational mode. The device works at a nominal power of the lamp (4) at the start point during a specific period of time (T1) (50), then the device attenuates the power consumption at a specific percentage regarding the nominal power (% PN) (53) during a specific time (T2) (51), and returns to its nominal power at the end of the operation sequence with a given duration (T3) (52).

FIG. 10 shows the operation of the energy saving device regarding the power consumption vs. time in a double attenuation operational mode. The device works at nominal power of the lamp (4) at the start point during a specific period of time (T1) (55), secondly, the device attenuates the power consumption at a specific percentage regarding the nominal power (% PN) (61) during a specific time (T2) (56), in the third step the system attenuates again the consumption (% PN)(59) during (T3)(57), returning to the first attenuation level (% PN) (61) with a duration of (T4) and finally, returns to its nominal power to end the operation sequence with a given duration (T5) (68).

Figure 11:
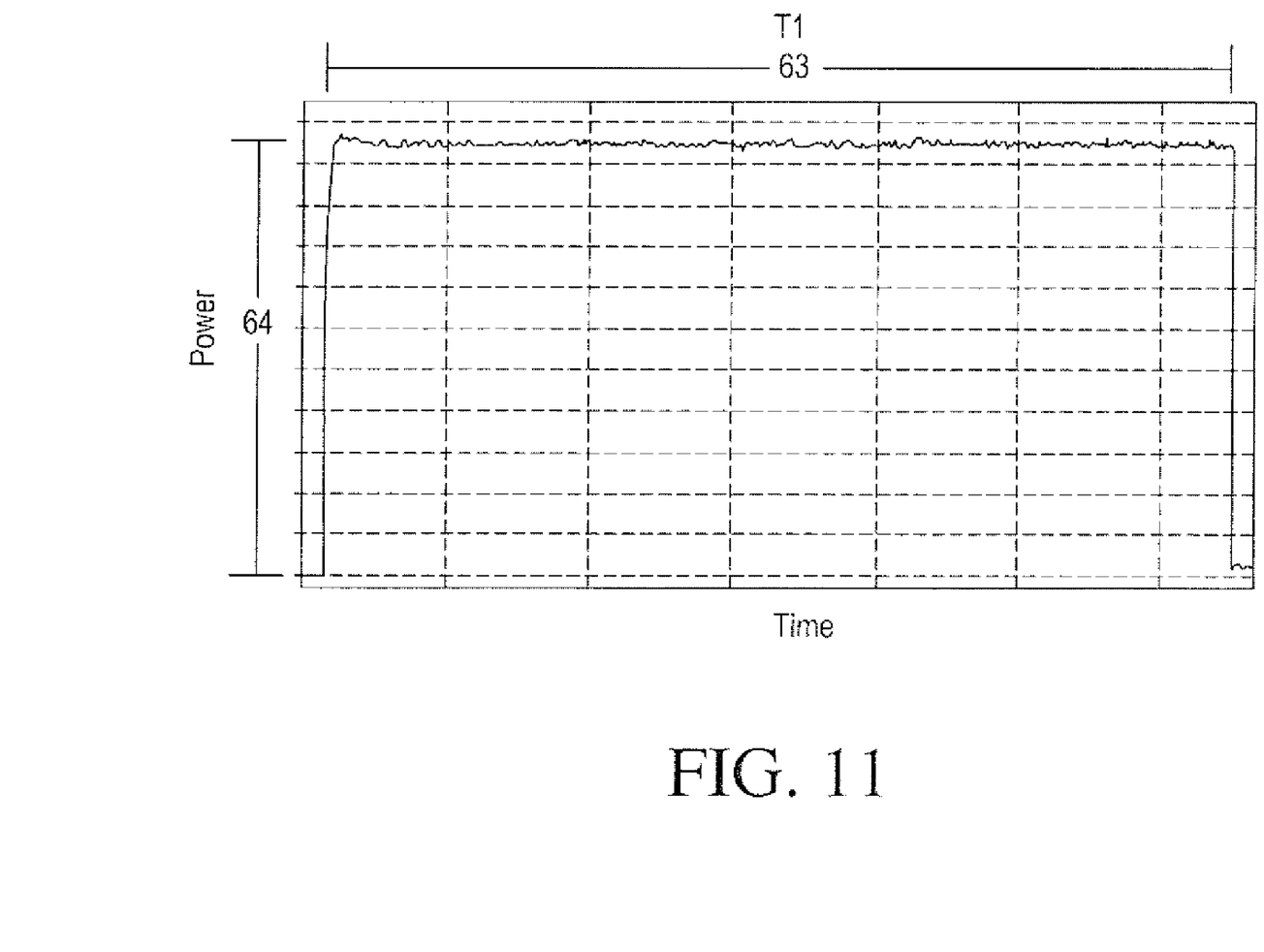
FIG. 11 shows an operation graph of the ballast without attenuation.

FIG. 11 shows the continuous operation mode wherein the device keeps the lamp (4) operating at its nominal power (64) all of the time (T1)(63).

The invention claimed is:

1. A method for energy saving in public lighting systems, the method comprising:
   operating a sodium-vapor street light at a nominal power during a first predetermined number of hours T1;
   reducing power supplied to the sodium-vapor street light to a first percentage of the nominal power, once a second predetermined number of hours T2 has elapsed;
   reducing the power supplied to the sodium-vapor street light to a second percentage the nominal power, wherein the second percentage is smaller than the first percentage, once a third predetermined number of hours T3 has elapsed;
   restoring the first percentage of the nominal power of the sodium-vapor street light, once a fourth predetermined number of hours T4 has elapsed;
   restoring the nominal power of the sodium-vapor street light; and,
   concluding by automatically turning off the sodium-vapor street light after a fifth predetermined number of hours T5;
   wherein ignition of the sodium-vapor street light involves regulation of frequencies around vacuum resonant frequency of a resonant tank circuit of a resonator, modulation of a switching frequency of the resonator prevents occurrence of an acoustic resonance phenomenon in the sodium-vapor street light and a sampling supply system of closed loop consumption to micro controller regulates output power to the sodium-vapor street light.

2. The method of claim 1, wherein an increased scan in a switching frequency of the resonator extends from substantially 90 to 93 percent of a nominal frequency of operation up to substantially 107 to 110 percent of the nominal frequency of operation and a decreased scan in the switching frequency extends from 107 to 110 percent of the nominal frequency of operation down to 90 to 93 percent of the nominal frequency of operation in maximum steps of 1 percent of the nominal frequency of operation, wherein frequency steps applied to the increased scan and the decreased scan are from 200 Hz to 300 Hz.

3. The method of claim 1, further comprising: turning off the sodium-vapor street light, after either a predetermined period or 24 hours has elapsed.

4. The method of claim 1, wherein the sodium-vapor street light turns off once 24 hours have elapsed.

5. The method of claim 1, wherein ignition of the sodium-vapor street light comprises a frequency scan from 95 percent of the vacuum resonant frequency in the resonant tank circuit of the resonator up to 105 percent of the vacuum resonant frequency.

6. The method of claim 1, wherein modulation of the switching frequency of the resonator uses either a sinusoidal, triangular, rectangular, or exponential test signal.

7. The method of claim 1, wherein modulation of the switching frequency of the resonator comprises an index value of between 5 and 50.

8. The method of claim 1, further comprising:
   when attempting to turn the sodium-vapor street light on, applying impulses, each of the impulses consisting of at least eight test signals wherein a delay period between each test signal should be at least 5 seconds.

9. The method of claim 8, further comprising:
   deactivating the resonator after repeated attempts to restart the sodium-vapor street light fail.

* * * * *